Figure 1:
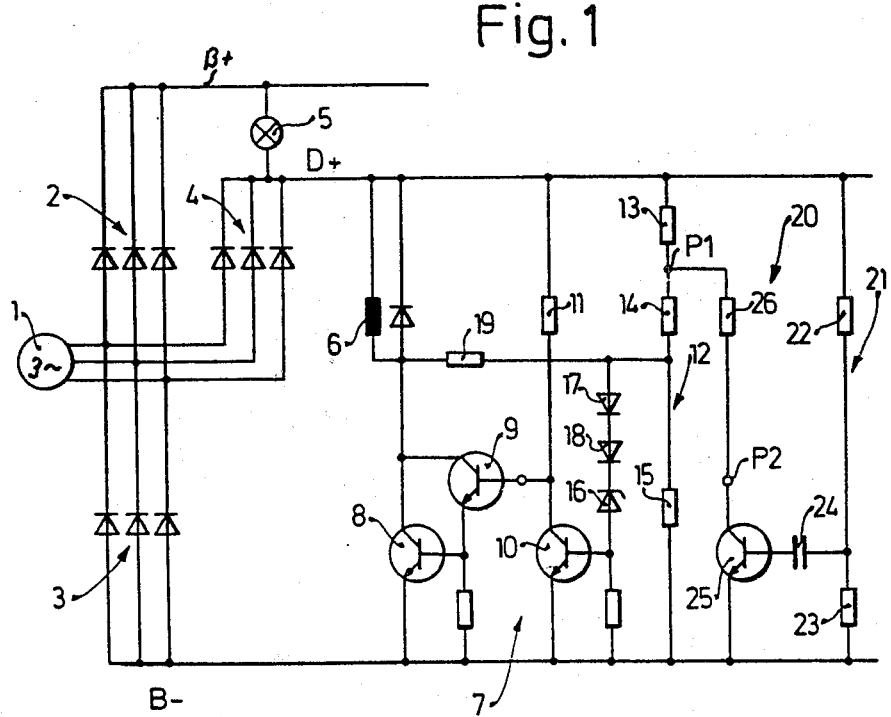

United States Patent [19]

Kuhn

[11] 4,340,849
[45] Jul. 20, 1982

[54] RIPPLE-COMPENSATED VOLTAGE REGULATOR, PARTICULARLY FOR AUTOMOTIVE USE

[75] Inventor: Edgar Kuhn, Gerlingen, Fed. Rep. of Germany

[73] Assignee: Robert Bosch GmbH, Stuttgart, Fed. Rep. of Germany

[21] Appl. No.: 185,907

[22] PCT Filed: Mar. 27, 1979

[86] PCT No.: PCT/EP79/00024

§ 371 Date: Dec. 4, 1979

§ 102(e) Date: Nov. 29, 1979

[87] PCT Pub. No.: WO79/00878

PCT Pub. Date: Nov. 1, 1979

[30] Foreign Application Priority Data

Apr. 4, 1978 [DE] Fed. Rep. of Germany ....... 2814424

[51] Int. Cl.³ .............................................. H02J 7/14
[52] U.S. Cl. ...................................... 322/28; 322/58; 322/73
[58] Field of Search .................... 322/28, 58, 59, 73

[56] References Cited

U.S. PATENT DOCUMENTS 3,942,097 3/1976 Itoh et al. .............................. 322/28
4,129,819 12/1978 Arendt .................................. 322/28
4,141,613 2/1979 Mori et al. ............................ 322/28
4,143,313 3/1979 Arendt .................................. 322/28
4,223,363 9/1980 Santis et al. .......................... 322/28
4,237,412 12/1980 Rundlöf ................................ 322/28

Primary Examiner—Robert J. Hickey
Attorney, Agent, or Firm—Frishauf, Holtz, Goodman & Woodward

[57] ABSTRACT

Being proposed is a circuit for association with the regulator of an electrical generator, especially an AC generator, and serving to smooth the voltage supplied by the electric generator. The circuit includes a compensation device consisting of at least one active semiconductor switching element, usually a transistor, and so connected to the regulator input as a supplement thereto that the generator output voltage is smoothed by a compensation voltage whose own ripple or oscillatory component is in opposite phase to the generator voltage.

In particular, the compensation circuit includes a voltage divider connected to the generator output voltage and having a tap which is connected via a capacitor to the control electrode of the transistor whose main conducting path is connected in parallel to a further voltage divider joined to receive the generator voltage as well as to supply the input voltage to the regulator.

4 Claims, 2 Drawing Figures

RIPPLE-COMPENSATED VOLTAGE REGULATOR, PARTICULARLY FOR AUTOMOTIVE USE

STATE OF THE ART

The invention relates to a circuit for smoothing a generator voltage especially an AC generator for the on-board electrical supply in motor vehicles, ships and the like. Electric generators are known for providing the on-board electric supply of a motor vehicle. In recent times, so-called AC generators have found increasing application and the generated electrical voltage is rectified prior to connection to the vehicles electrical system; this system is a DC voltage system principally because a storage battery is used for storing the electrical energy.

A customary AC generator may be constructed, for example, to include a rotor which induces a voltage within a three-phase stator coil which is a stationary part of the generator and which may be connected in a star or triangle configuration. The induced voltage is then rectified by means of a rectifier bridge circuit having three so-called positive diodes and three so-called negative diodes. The rotor carries an exciter winding which may be a normal ring coil which receives the necessary exciter current from a regulator. The exciter winding may be associated with magnetic poles, for example two claw-pole halves, which interleave and surround the exciter winding on both sides. The exciter current is applied to the exciter coil by means of carbon brushes which bear against two slip rings mounted on the rotor shaft. It is customary to take off the exciter current over diodes separate, called exciter diodes, from the individual phase windings of the stator winding and to apply them to the exciter windings via a regulator which has at least one main control path. The construction of the regulator is such that it regulates the generator voltage independently of the load and speed of rotation to a constant value by regulating the exciter current for the exciter windings in the desired manner. Inasmuch as each separate phase of the stator winding generates a substantially sinusoidal alternating voltage, the rectified generator voltage is composed of a DC component and, superimposed thereupon a ripple AC component. The degree of ripple depends on the number of rectified half-waves per unit time and this number of half-waves in turn depends on the frequency of alternations of the magnetic field. The regulator can perform its task of maintaining a constant value of the generator voltage in a satisfactory manner only if the generator voltage is as smooth as possible, i.e., if the regulator receives an input voltage which, while proportional to the exciter voltage generated by the generator, exhibits as little ripple as possible.

In this connection, it is known to associate a capacitor with the regulator input in the manner of a filter capacitor which serves to smooth the regulator input voltage and thus also to smooth the final generator output voltage because such a capacitor receives charge when the voltage is excessive (voltage peak) and returns charge when the voltage decreases again. However, it is a particular disadvantage of a smoothing process which depends on a capacitor that the ripple of the voltage is only reduced but cannot be fully removed. Furthermore, the relatively high currents and low voltages which are predominant in motor vehicles or similar systems using AC generators require a capacitor with a relatively very high capacitance to obtain sufficient smoothing.

THE INVENTION

Briefly, a transistor, receiving input signals through a small capacitor, is connected to modify the voltage applied to the regulator reference circuit, the transistor operating as an inverter to apply a 180° out-of-phase ripple voltage thereto, to thereby compensate for ripple in the generator, so that the reference circuit of the voltage regulator will be essentially free from ripple and thereby permit output of the voltage regulator, controlling the field or exciter winding of the generator, likewise to be independent of ripple of the output voltage provided by the generator.

The circuit has the advantage that the ripple of the voltage generated by the AC generator and supplied to the regulator is completely removed and that this is accomplished by means other than the reduction of the wave amplitude down to a point where the remaining ripple would be without technical significance; (which would be uneconomical. Rather, according to the invention, the AC component of the voltage supplied by the generator to the regulator at a terminal which is designated by the symbol D+, is fully compensated by a compensating circuit which applies a signal in opposite phase to the AC component of the generator. The complete compensation of the AC component of the generator voltage can be achieved according to the invention by the use of a capacitor having relatively low capacitance which is advantageous, especially at high temperatures. In spite of this simplification, the regulator operates with desirable characteristics. The reduction of the capacitance of the capacitor is especially advantageous when the regulator is constructed in hybrid or integrated circuit technology.

THE DRAWING

An exemplary embodiment of the invention is illustrated in the drawing and is described in greater detail in the following specification.

Figure 2:
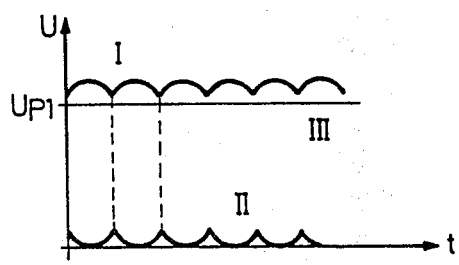

FIG. 1 illustrates one possible exemplary form of the circuit system according to the invention in association with an AC generator having separate exciter diodes and FIG. 2 is a diagram illustrating the voltages as a function of time at various points of the circuit to illustrate the function of the circuit.

DESCRIPTION OF THE EXAMPLES OF THE INVENTION

Before discussing the invention in detail, it should be noted that the invention is suitable for application in any kind of regulator or generator system, especially AC generators, because the basic idea of the invention is to apply a signal of opposite phase to the AC component of the generator to reduce the ripple of the generator signal to practically zero for the purpose of smoothing the generator output voltage.

In the illustration of FIG. 1, the generator is shown as an AC generator having three stator windings and is designated with the numeral 1. The three external voltage connections of the generator are connected to the anodes of positive diodes 2 as well as to the cathodes of negative diodes 3 whose joined anodes constitute the negative bus or ground of the system. This system con- stitutes the on-board electrical system of a vehicle and its terminals are designated with the designations of B+ and B−. Various other terminals illustrated in the drawing also conform to conventional nomenclature.

In order to complete the bridge rectifier circuit 2, the AC generator also includes three separate exciter diodes 4 which are also connected to the taps of the stator winding and whose joined cathodes constitute the connection D+. In conventional manner, the contact D+ is connected to the contact B+ via the charge-indicating lamp 5 through which a pre-exciter current may flow from the vehicle battery connected to the B+ bus when the generator is first started.

The exciter or field winding 6 is connected to the terminal D+ and is further connected through the main switching path of a regulator 7 and thence to vehicle ground or the B− bus. In the illustrated example, the regulator consists of two main transistors 8 and 9, which constitute a type of Darlington circuit. Their collector-emitter paths constitute the main switching path of the regulator 7 and the base of the transistor 9 which controls the Darlington combination 8, 9 is connected to the collector of a further transistor 10. The emitter of the transistor 10 is connected directly to ground (B−) and its collector is connected through a further resistor 11 to the positive bus (D+). The base circuit of the transistor 10, which controls the regulator, includes a first voltage divider 12 composed of resistors 13, 14 and 15, the junction of the resistors 14 and 15 being joined via at least one zener diode 16 to the base of the transistor 10, if necessary through one or more further conducting diodes 17 and 18. The manner of operation of this type of transistorized regulator 7 is such that the full exciter current flows from the exciter diodes through the terminal D+ and through the emitter-collector paths of the transistors 8 and 9 and hence also through the exciter windings 6 as long as the transistor 10 blocks which is the case whenever the generator voltage, i.e., the generator voltage present at the contact D+ has not yet reached the nominal value defined by the zener diode 16. If the voltage at the input voltage divider 12 of the regulator 7 does reach the nominal voltage of the zener diode, the zener diode 16 breaks down, causing the transistor 10 to conduct and the Darlington combination 8, 9 to block so that no exciter current can flow any longer. Accordingly, the voltage drops below the nominal value and the main switching path of the regulator is again rendered conducting. This sequence of events is repeated at high frequency. The resistor 19 provides a feedback path which introduces hysteresis. The circuit so far described is capable of providing a precisely regulated voltage provided that the ripple of the generator output voltage does not have disadvantageous effects because the battery requires that the arithmetic mean of the generator voltage be held constant by the regulator.

In order to solve the problem of smoothing the generator voltage so as to obtain a constant generator output voltage independently of load and rpm of the generator, the circuit of FIG. 1 further includes a compensation circuit 20 which is associated to the regulator input, i.e., at its input voltage divider 12, and connected thereto at the circuit point P1. The compensation circuit 20 is so constructed as to receive the generator voltage present at the contact D+ or, more precisely, the compensation circuit recognizes the ripple of the generator voltage and applies the AC component of the generator voltage in opposite phase to the input of the regulator so that the circuit point P1 receives a regulator input voltage which is completely free of any ripple. The diagram of FIG. 2 illustrates these facts; the curve I shows the rectified generator voltage including the usually present ripple, the curve II illustrates the voltage which is formed by the compensation circuit 20 as an output voltage and is present, for example, at the circuit point P2. By applying this output voltage which is in opposite phase with respect to the generator AC component, the point P1 now carries a pure DC voltage $U_{P1}$, shown as curve III of FIG. 2, i.e., a DC voltage having no ripple or oscillatory component at all. Thus the regulator input receives a DC voltage which makes possible a reaction of the regulator 7 independent of any ripple of the generator voltage so that the generator voltage is optimally smooth and can be held at a desired constant value independently of generator load or speed.

The compensation circuit 20 consists of a voltage divider circuit 21 formed by two resistors 22, 23 the junction of which is connected via a capacitor 24 of relatively low capacitance to the control input of an active semiconductor switch, i.e., the transistor 25. The capacitor 24 transmits the AC component of the generator voltage present at the contact D+ to the transistor 25 whose collector develops a voltage with a ripple of opposite phase thereto and illustrated as curve II of FIG. 2 and applies the same through a further resistor 26 to the circuit point P1. The compensatory voltages applied there result in a DC voltage whose AC component has been reduced to zero for all practical purposes.

As an alternative to the as shown, the compensation circuit and the zener diode 16 may be connected to the same circuit point of the voltage divider circuit 12 via respective diodes 17 and 18, i.e., it is possible to dispense with the resistor 14.

I claim:

1. Ripple-compensated voltage regulator circuit for connection to and in combination with an electrical generator, especially an AC generator, having a field winding, for the on-board electrical supply in motor vehicles, ships, and the like, having a main switching circuit including a semiconductor switch (8, 9) serially connected with the field or exciter winding (6) of the generator;

a control transistor (10) having its main switching path connected to the control terminal of the semiconductor switch, and to the output of the generator;

a voltage divider (13, 14, 15) connected across the output of the generator;

a Zener diode (16) connected to a junction of the voltage divider and to the base of the control transistor (10) to provide for conduction of the control transistor when the generator voltage exceeds the nominal or set-point voltage defined by the Zener diode (16) and thus switches the semiconductor switch (8, 9) of the regulator into non-conducting state, thereby blocking current flow through the exciter or field winding (6), said control transistor becoming blocked or non-conducting whenever the generator voltage drops below the nominal set-point voltage defined by the Zener diode (16) to permit the semiconductor switch (8, 9) of the regulator to become conductive and permit current flow through the exciter or field winding (6);

and further comprising a compensation circuit (20) including an active semiconductor switch (25) connected as an inverter, controlled by the undulating portion of the voltage supplied by the generator, and supplying a compensation voltage (II) of opposite phase to the undulating portion of the voltage supplied by the generator to a tap point of said voltage divider, whereby the Zener diode will receive a control voltage unaffected by generator ripple.

2. Circuit according to claim 1, wherein said voltage divider (13, 14, 15) comprises three resistors, the Zener diode (16) being connected to a junction between a first and a second resistor (15, 14), and the inverter transistor (25) having its collector connected to the junction between the second and third resistor (14, 13).

3. Circuit according to claim 1, including a coupling resistor (26) connecting the collector (P2) of the inverter transistor (25) to the junction (P1) of the voltage divider.

4. Circuit according to claim 2, including a coupling resistor (26) connecting the collector (P2) of the inverter transistor (25) to the junction (P1) of the voltage divider.

* * * * *

UNITED STATES PATENT AND TRADEMARK OFFICE
CERTIFICATE OF CORRECTION

PATENT NO. : 4,340,849
DATED : July 20, 1982
INVENTOR(S) : Edgar KUHN

It is certified that error appears in the above—identified patent and that said Letters Patent is hereby corrected as shown below:

Col. 1, line 34, change "diodes separate" to -- separate diodes --.

Col. 4, line 30, before "as shown" insert -- connection --.

Change Claim 1 to read:

1. Ripple-compensated voltage regulator circuit for connection to and in combination with an electrical generator, especially an AC generator, having a field winding, for the on-board electrical supply in motor vehicles, ships, and the like,
   having a main switching circuit including a semiconductor switch (8, 9) serially connected with the field or exciter winding (6) of the generator;
   a control transistor (10) having its main switching path connected to the control terminal of the semiconductor switch, and to the output of the generator;
   a voltage divider (13, 14, 15) connected across the output of the generator;
   a Zener diode (16) connected to a junction of the voltage divider and to the base of the control transistor (10) to provide for conduction of the control transistor when the generator voltage exceeds the nominal or set-point voltage defined by the Zener diode (16) and thus switches the semiconductor switch (8, 9) of the regulator into non-conducting state, thereby blocking current flow through the exciter or field winding (6), said control transistor becoming blocked or non-conducting whenever the generator voltage drops below the nominal set-point voltage defined by the Zener diode (16) to permit the semiconductor switch (8, 9) of the regulator to become conductive and permit current flow through the exciter or field winding (6);
   and further comprising a compensation circuit (20) including an active semiconductor switch (25) connected as an inverter, controlled by the undulating portion of the voltage supplied by the generator,
   and supplying a compensation voltage (II) of opposite phase to the undulating portion of the voltage supplied by the generator to a tap point of said voltage divider, whereby the Zener diode will receive a control voltage unaffected by generator ripple; and a second voltage divider (21,22) and a coupling capacitor (24) connected to a tap point of said second voltage divider, said capacitor being connected to the base of an inverter transistor (25) applying said undulating portion of the voltage supplied by the generator to the inverting

UNITED STATES PATENT AND TRADEMARK OFFICE
CERTIFICATE OF CORRECTION

PATENT NO. : 4,340,849

DATED : July 20, 1982

INVENTOR(S) : Edgar KUHN

It is certified that error appears in the above-identified patent and that said Letters Patent is hereby corrected as shown below:

transistor, said inverter transistor (25) forming the active semiconductor switch.

Signed and Sealed this

Twelfth Day of October 1982

[SEAL]

Attest:

GERALD J. MOSSINGHOFF

Attesting Officer

Commissioner of Patents and Trademarks